March 18, 1969     G. E. SWEET ET AL     3,433,953
COMPENSATING RADIOMETER
Filed Jan. 4, 1967
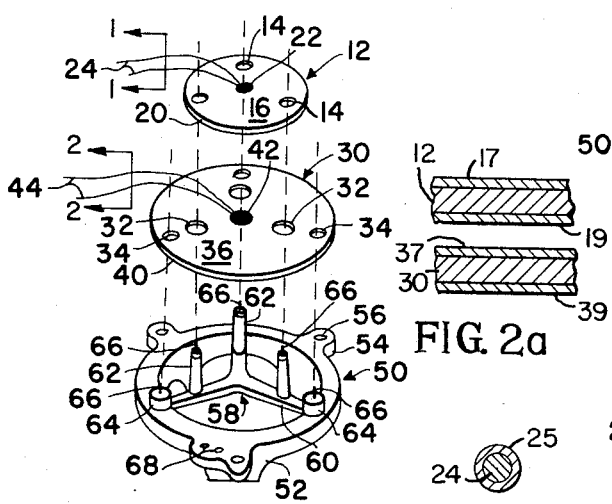
FIG. 1
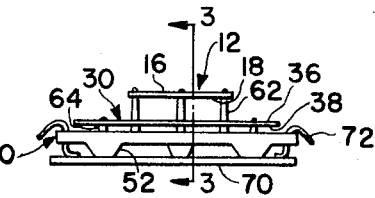
FIG. 2a
FIG. 1a
FIG. 1b
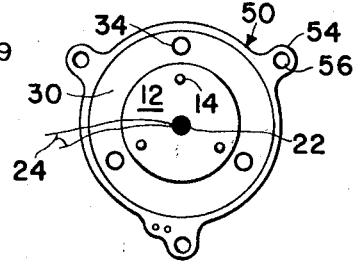
FIG. 2
FIG. 3
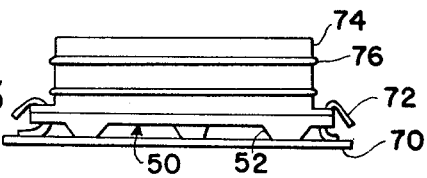
FIG. 4
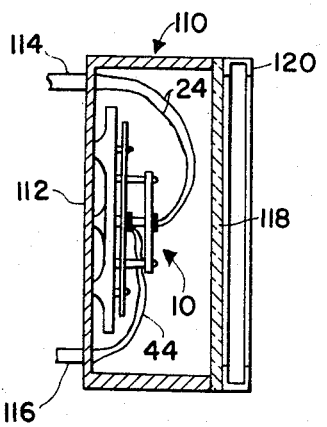
FIG. 7
FIG. 5
FIG. 6
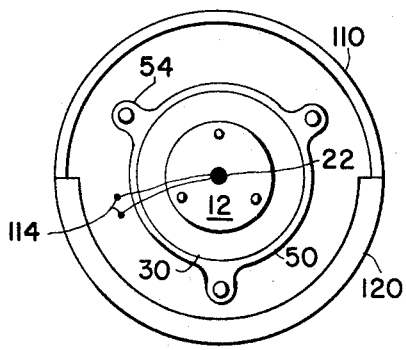
FIG. 8
INVENTORS
GEORGE E. SWEET
WILLIAM W. ANDERSON, JR
HOWARD B. MILLER
BY
ATTORNEYS

United States Patent Office 3,433,953
Patented Mar. 18, 1969

3,433,953
COMPENSATING RADIOMETER
George E. Sweet, Yorktown, William W. Anderson, Jr., Newport News, and Howard B. Miller, Hampton, Va., assignors to the United States of America as represented by the Administrator of the National Aeronautics and Space Administration
Filed Jan. 4, 1967, Ser. No. 607,608
U.S. Cl. 250—83                                           11 Claims
Int. Cl. G01t 7/00

ABSTRACT OF THE DISCLOSURE

This invention relates to a radiometer which is capable of measuring low level radiant energy and which consists of a mount made of a material having a low thermal conductivity, low specific heat, low outgassing, and good dimensional stability over a large temperature range. A metal having good thermal conductivity is used for a sensor and compensating shield in order to minimize thermal gradients therein. The upper surfaces of these elements which face the radiation to be measured, are coated with a material of high absorptance. Two temperature detectors, such as thermocouples or resistance thermometers, are attached to the upper surfaces of the sensor and compensating shield. The under surfaces of the sensors and compensating shield are coated with a low emittance material and the compensating shield is larger than the sensor so that the exposed surface of the shield will also receive direct radiant energy, thus reducing the temperature gradient between the sensor and shield.

---

The invention described herein was made by employees of the United States Government and may be manufactured and used by or for the Government for governmental purposes without the payment of any royalties thereon or therefor.

This invention relates generally to a radiation calorimeter and more particularly to a radiometer for measuring the total radiant energy incident to a specific surface.

Radiant energy is usually determined by either the slug or slope radiometer concepts or the thermal gradient technique. The energy incident to the slope radiometer is determined from a knowledge of sensor mass, specific heat, heat absorptance and measurements of the sensor time temperature history. Although this type of radiometer is rugged and compact it has the disadvantage of not being able to detect rapid transient changes in the incident energy. The incident energy of the thermal gradient radiometer is determined from the temperature gradient between a low mass sensor of known heat absorptance and a surrounding heat sink. However, this concept has the disadvantage that once the heat sink and sensor come to a temperature equilibrium, the radiometer output signal is zero even though the incident energy is not. In order to determine the incident energy after an extended exposure to the time varying heat source, it is necessary to either provide a means for maintaining the heat sink at a constant temperature or to continuously monitor the radiometer readings and reference them to an initially known heat intensity.

There are several disadvantages common to both of these concepts such, for example, as errors due to heat loss, mass effects, degradation of heat measuring surface and radiometer outgassing. At low levels of incident energy the heat losses through lead wire insulation may be a large portion of the total energy absorbed by the sensor and can be partially offset by increasing the sensor size. As a result these devices become cumbersome when designed to accurately measure low energy levels. Because relatively large masses are required for the sensor (slug concept) or the heat sink (gradient technique) these devices may have a large thermal mass as compared to the test specimens with a result that heat storage of these devices may significantly affect the heat transfer measurement. Another potential source of error is a change in sensor heat absorption and emittance coefficients with time due to degradation of the sensor surface. Measurements taken under high vacuum conditions can be significantly influenced by the presence of entrapped gases and the continuing release of gases or material from radiometer components. The presence of these gases may increase heat transfer rates between radiometer components and test surfaces or may contaminate such surfaces.

In order to overcome the disadvantages of the prior art, it is an object of this invention to provide a radiometer which is capable of accurately measuring low level radiant energy.

Another object of this invention is to provide a radiometer which may be utilized to measure total radiant energy incident to a surface in either a vacuum or atmospheric environment.

A further object of the invention is to provide a radiometer that may be utilized as a rapid response heat detector at atmospheric pressure.

Still another object of this invention is to provide a low cost reliable and accurate radiometer combining the advantages of the slug and thermal gradient concepts that provides a continuous indication of energy level.

A still further object of the instant invention is to provide a radiometer having a sensor and larger compensating shield supported by a mount of low thermal conductive material with temperature detectors attached to the upper surfaces of the sensor and compensating shield.

Yet another object of this invention is to provide a radiometer utilizing a sensor plate and larger compensating shield supported by a mount of low thermal conductive material with temperature detectors attached to the upper surfaces of the sensor plate and compensating shield and a cylindrical shield around the radiometer to permit measurement of radiant energy from a selected direction.

A further object of the instant invention is to provide a radiometer having a sensor plate and spaced compensating shield which is larger than the plate and flanged to prevent radiant energy from heating the sensor plate supports extending from a mount of low thermal conductive material.

A still further object of this invention is to provide a radiometer utilizing a spaced sensor plate and compensating shield secured to a low thermal conductivity mount all encapsulated in a sealed vacuum container having one portion made of a material selected for its transparency to radiant energy or attachable filters transparent to any specified wave lengths in order to permit measurement of radiant energy of the selected band width frequency and to differentiate between the convective and radiant energy components conveyed by a gas or gaseous mixture.

Generally, the foregoing and other objects are accomplished by utilizing a circular sensor plate which is attached in spaced relation to a mount in which a compensating shield is secured between the sensor and mount in spaced relationship to each. Temperature detectors are mounted on the upper surfaces of the sensor plate and compensating shield in order to convey accurate measurements of low thermal radiant energy. This invention also contemplates the utilization of a directional shield for insuring measurement of radiation from a specified direction as well as an encapsulated embodiment utilizing filtration.

A more complete appreciation of the invention and many of the attendant advantages thereof will be readily apparent as the same becomes better understood by reference to the following description when considered in connection with the accompanying drawings wherein:

FIG. 1 is an exploded isometric view of a radiometer of the instant invention;

FIG. 1a is a partial view of the section taken along line 1—1 in FIG. 1;

FIG. 1b is a partial view of the section taken along line 2—2 in FIG. 1;

FIG. 2 is a side view of the instant invention;

FIG. 2a is a partial view of the section taken along line 3—3 in FIG. 2;

FIG. 3 is a top view of the assembled invention of FIG. 1;

FIG. 4 is an isometric view of an attachment for the device of FIG. 1;

FIG. 5 is a side elevational view of the device of FIG. 1 incorporating the attachment of FIG. 4;

FIG. 6 is an isometric view of an alternative component of the instant invention;

FIG. 7 is a diagrammatic top sectional view of an alternative embodiment of this invention; and FIG. 8 is a diagrammatic end view of FIG. 7.

Referring now to the drawings and more particularly to FIG. 1 wherein radiometer 10 is shown to be comprised of sensor plate 12, compensating shield 30 and mount 50. Sensor plate 12 is substantially circular having equally spaced apertures 14, for a purpose to be described more fully hereinafter. Sensor 12 may be embossed to increase rigidity and upper surface 16 has a coating 17 to enhance heat absorption. Sensor plate 12 has edge 20 and undersurface 18, coated with a low heat emittance coating 19, to define the extent of the sensor plate itself. Attached to upper surface 16 of sensor 12 is thermal detector 22 having leads 24 for conveying the signal to instrumentation, not shown. The upper surface of temperature detector 22 is coated with a highly absorptant material, similar to surface 16, in order to enhance the absorptance qualities of the sensor. It is to be noted that the upper surface of sensor plate 12 and temperature detector 22 are directed to the source of radiation emittance and provide best results when the upper surfaces are coated with a gray material.

Compensating shield 30 includes radially spaced apertures 32 and 34 for a purpose to be described more fully hereinafter. Shield 30 is defined by upper surface 36, lower surface 38 and edge 40. As seen in FIGS. 1 and 3, compensating shield 30 is also preferably of circular configuration and of larger diameter than sensor plate 12. As is the case of sensor plate 12, compensating shield 30 is made of a metal having good thermal conductivity such as copper, aluminum or silver and may be embossed to increase its rigidity. Increased rigidity may be necessary because sensor 12 and shield 30 are generally in the range of 1 to 5 mils in thickness and about one-half and three-fourths inches, respectively, in diameter. Upper surface 36 has a coating 17 similar to that on surface 16 of sensor 12 to enhance heat absorption characteristics and lower surface 38 has a coating 39 of a low heat emittance material similar to 19 on sensor 12. Temperature detector 42 is attached centrally of upper face 36 and leads 44 connect detector 42 with instrumentation, not shown. Leads 24 and 44 have coatings 25 and 45 in the region of detectors 22 and 42, respectively, to enhance their heat absorption characteristics and to avoid heat losses.

Mount 50 is either molded or machined from a material having the physical properties of low thermal conductivity, low specific heat, low outgassing and good dimensional stability over a wide temperature range. A plastic is preferable for most applications; however, a ceramic or metal could be utilized for high levels of radiant energy. As best seen in FIG. 2, mount 50 is of generally ring or circular configuration having feet 52 extending downwardly therefrom at spaced circumferential locations. Extending outward from the circumference of mount 50 are attachment bosses 54 having attachment holes 56 therein. Y-shaped crossbar 58 extends across the interior of mount ring 50 and is rigidly affixed thereto at the extremities of arms 60. Sensor supports 62 are rigidly attached to arms 60 at radially spaced locations and extend upwardly through apertures 32 in shield 30 and apertures 14 in sensor plate 12 to support sensor plate 12. Shield supports 64 are radially alined with sensor supports 62 and are located on mount ring 50 to support shield 30 through apertures 34. Locating pins 66 in sensor support 62 and shield support 64 serve to accurately locate sensor 12 atnd shield 30 on the respective supports to provide secure attachment of these respective elements to mount 50.

It is to be noted that arms 60 and thus supports 62 and 64 are located on mount 50 substantially centrally of feet 52 to provide the longest possible heat path between sensor 12 and the surface to which radiometer 10 is attached. For some installations it may be necessary to utilize tie points or apertures 68, FIGS. 1 and 3, in one of the equally, radially spaced bosses 54 for proper location of leads 24 and 44.

Referring now to FIGS. 2, 4, and 5, ring 70 is shown to be substantially planar with wire 72 attached thereto by soldering or other well known means. As best seen in FIG. 2, wires 72 serve as attachments for ring 70 and mount 50 by extending through apertures 56 in bosses 54 and being bent downwardly to accurately locate ring 70 and mount 50. Although only two wires 72 are shown, it is to be understood that three wires adequately secure mount 50 and ring 70. Directional shield 74 is substantially cylindrical having ribbed stiffeners 76 formed thereon. Tabs 78 are rigidly attached to shield 74 and extend radially outward therefrom at locations coincident with bosses 54. Holes 80 in tabs 78 coincide with holes 56 in bosses 54 to permit shield 74 to be attached on mount 50 substantially as shown in FIG. 5.

Referring now to FIG. 6 wherein an alternative embodiment of compensating shield 30 is shown. Shield 90 has clearance apertures 92 and radially alined apertures 94 for receiving locating pins 66, FIG. 1. Upper surface 96 is coated with an absorptive material and lower surface 98, not visible, is coated with a material having high reflective characteristics such as gold. Flange 100 extends about the periphery of shield 90, commencing at lower surface 98 and terminating approximately in the plane of sensor plate 12. Outer surface 102 is coated with a highly reflective material and inner surface 104 is coated with a highly absorptive material. The configuration shown in FIG. 6 for compensating shield 90 prevents radiation from reaching supports 62 to thereby prevent inaccurate measurements by detector 22 because of the conducted energy.

FIGS. 7 and 8 show an alternative embodiment wherein radiometer 10 is encapsulated within airtight container 110. One end 112 of container 110 is adapted for mounting radiometer 10 thereon and has conduit pins 114 for leads 24 and conduit pins 116 for leads 44. The other end or front face 118 of container 110 is made from a material transparent to radiant energy. Channel 120 extends around the lower portion of container 110 and is adapted to receive various filters, not shown, that would be transparent to radiant energy of specified wavelengths. For best results in using the encapsulated embodiment of FIGS. 7 and 8, it may be necessary to attach a temperature detector, not shown, on container 110 in order to provide a reference container temperature. It is to be understood also that, although container 110 is shown as a right cylinder, front face 118 could be arcuate to permit reception by radiometer 10 of less directional radiant energy.

OPERATION

A knowledge of the magnitude of radiometer heat losses is necessary in order to determine the incident radiant energy. The present invention utilizes compensating shield 30, located just below sensor 12, to intercept sensor heat losses. That is, the shield is positioned and connected in such a relationship with the sensor so that radiative and conductive heat transfer with respect to the sensor must take place with the shield or the radiation source, if at all. A temperature difference between these elements is a factor in the amount of heat transfer therebetween, and thus this temperature difference is an indicator of the heat loss from sensor 12. Hence, the incident radiant energy may be accurately computed from the temperature of the sensor and by accounting for a correction factor K, proportional to this temperature difference. This factor may be determined from either calculations or calibration data. For best accuracy, it is desirable to keep K small by minimizing heat losses. This may be done by coating the under surfaces of sensor 12 and shield 30 with the same low heat emittance material, such as gold, to reduce radiation losses and making compensating shield 30 larger than sensor 12 so that it also receives the radiant energy from the source. The resulting temperature gradient between sensor 12 and shield 30 will then be small and the sensor heat losses reduced. Providing long thermal conducting paths between the radiometer elements and the test surface also serves to maintain K at a minimum.

The accuracy of heat transfer measurements can be affected by the presence of gases trapped within the radiometer and by high outgassing rates of the radiometer materials. The present device is of open design in order to eliminate trapped gases and it can be constructed of materials which have negligible outgassing. In addition, the present invention is designed for minimum variation of product to thereby permit each lot of radiometers built to be calibrated in mass and not individually.

In the event it becomes necessary to measure radiant energy of certain specified wavelengths the instant invention is capable of modification by encapsulating the basic radiometer in a container permitting attachment of optical filters made frtm a material that is selected for its transparency to radiant energy of certain specified wavelengths. The shield enables the radiometer to measure the radiant energy of selected band widths of frequencies, instead of the whole spectrum, and also permits differentiations between the convective and radiant energy components conveyed by or directed through a gas or gaseous mixture.

The instant invention combines the major advantages of devices employing other radiometric methods such as small size, resistance to mechanical shock, rapid response and simplicity of data reduction. It may be used for either intermittant or continuous readings. Heat sinks or cooling or heating devices are not required since the sensitivity of the instrument is such that the incident radiant energy, or changes therein, are detected instantaneously. Despite the small size of the device the compensating shield permits accurate measurements to be made at low levels of incident energy, even when a substantial temperature difference exists between the sensor and the mounting surface. The energy measurements are not directly related to the sensor emittance or absorptance, hence degradation of coatings will not seriously affect the accuracy. The device can be built from materials which have low outgassing and is designed to prevent trapping or gases within the radiometer itself. Thus, the affects of test surface contamination and gaseous thermal conduction are minimized. The instant radiometer does not require a large mass sensor or heat sink and as a result heat absorbed or given up by this device will have a minimal affect on heat transfer to be measured. Quantity production with corresponding savings in unit cost and calibration time are further advantages of the instant invention.

Obviously many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. A radiometer comprising: sensor means having a surface portion for absorptance of radiant energy; spaced compensating shield means having a surface portion positioned to absorb radiation emitted from substantially all other surface portions of said sensor means; detector means mounted on said sensor means and said compensating shield means to indicate the temperature of each of said sensor means and compensating shield means; means for mounting said sensor means and compensating shield means above a surface whereby the temperature levels of said sensor means and said shield means together indicate the radiant energy received by said sensor means.

2. The radiometer of claim 1 wherein said sensor means surface portion and said shield means surface portion are substantially planar; and said shield means surface portion of larger area than said sensor means surface portion, whereby the temperature gradient between said sensor means and shield means is kept small by absorptance of radiant energy by said shield means and said sensor means heat losses are reduced.

3. The radiometer of claim 2 wherein said sensor means and said shield means are made from a material having high thermal conductivity characteristics; each of said sensor means and shield means having said surface portions coated with a highly absorptant material to enhance absorptance qualities thereof; and each of said other surface portions of said sensor means and shield means coated with a low heat emittance material, whereby radiation losses are reduced and accurate measurement of radiant energy is accomplished.

4. The radiometer of claim 3 wherein said mount is substantially circular having outwardly projecting bosses spaced about the circumference thereof for attaching the radiometer to a surface; a plurality of feet extending downwardly from the bottom of said mount and substantially equally spaced therearound; shield means supports extending upwardly from said mount substantially centrally of adjacent feet; a crossbar having a plurality of substantially equally spaced radial arms disposed in said mount and rigidly secured thereto; sensor means supports extending upwardly from each of said crossbar arms to support said sensor means above said shield means; and each of said arms secured to said mount substantially centrally of adjacent feet, whereby to provide the longest possible heat path between said sensor means and the surface to which the radiometer is attached.

5. The radiometer of claim 4 wherein said shield means has a plurality of apertures therethrough; said shield means apertures radially aligned and substantially equally spaced circumferentially about said shield means to form an inner row and an outer row; said shield means supports attached to said shield means at the outer row of apertures; said sensor means supports extending through the inner row of apertures; said sensor means having a plurality of substantially equally spaced apertures about the circumference thereof; and said sensor means mounted at said apertures on said sensor means supports.

6. The radiometer of claim 5 wherein conduit means are attached to each of said detector means mounted on said sensor and shield means for conducting temperature information from said detector means; and said conduit means coated in the region of said sensor and shield means with a highly absorptant material to enhance absorptance qualities thereof and prevent heat loss by radiation from said conduit means.

7. The radiometer of claim 6 wherein said sensor and shield means are made from the same high thermal conductive material; said surface portions of said sensor means, shield means, and detector means and said conduit means coated with the same highly absorptant gray material; the other surface portions of said sensor and shield means coated with the same low heat emittance material; and said mount, crossbar, and supports made from a material having low thermal conductivity characteristics.

8. The radiometer of claim 6 wherein said shield means includes an upwardly extending flange, whereby radiant energy is prevented from heating said sensor means supports and said radiometer measures radiant energy from a designated direction.

9. The combination of claim 6 wherein an airtight container encapsulates said radiometer; said container having at least one surface transparent to radiant energy; and said radiometer mounted in said container with said sensor means located adjacent to said one surface whereby radiant energy is accurately measured by said sensor means after it passes through said one surface.

10. The combination of claim 9 wherein said container is evacuated to provide a substantial vacuum therein; and attachment means on said container adjacent said one surface, whereby filters transparent to radiant energy of specified wavelengths may be disposed over said one surface to permit radiant energy measurement of a selected band width frequency and to differentiate between the convective and radiant energy components conveyed by a gas or gaseous mixture.

11. The radiometer of claim 1 wherein said mounting means supports said sensor means by means of a connection between said sensor means and said shield means, whereby conductive heat transfer with respect to said sensor means takes place solely through said shield means.

References Cited
UNITED STATES PATENTS

| | | | |
|---|---|---|---|
| 3,012,212 | 12/1961 | Hicks | 73—355 X |
| 3,098,380 | 7/1963 | Suomi et al. | 250—83 X |
| 3,131,304 | 4/1964 | Hager. | |

ARCHIE R. BORCHELT, *Primary Examiner.*